C. B. ARNOLD.
Hand Corn Planter.
No. 229,300.                           Patented June 29, 1880.
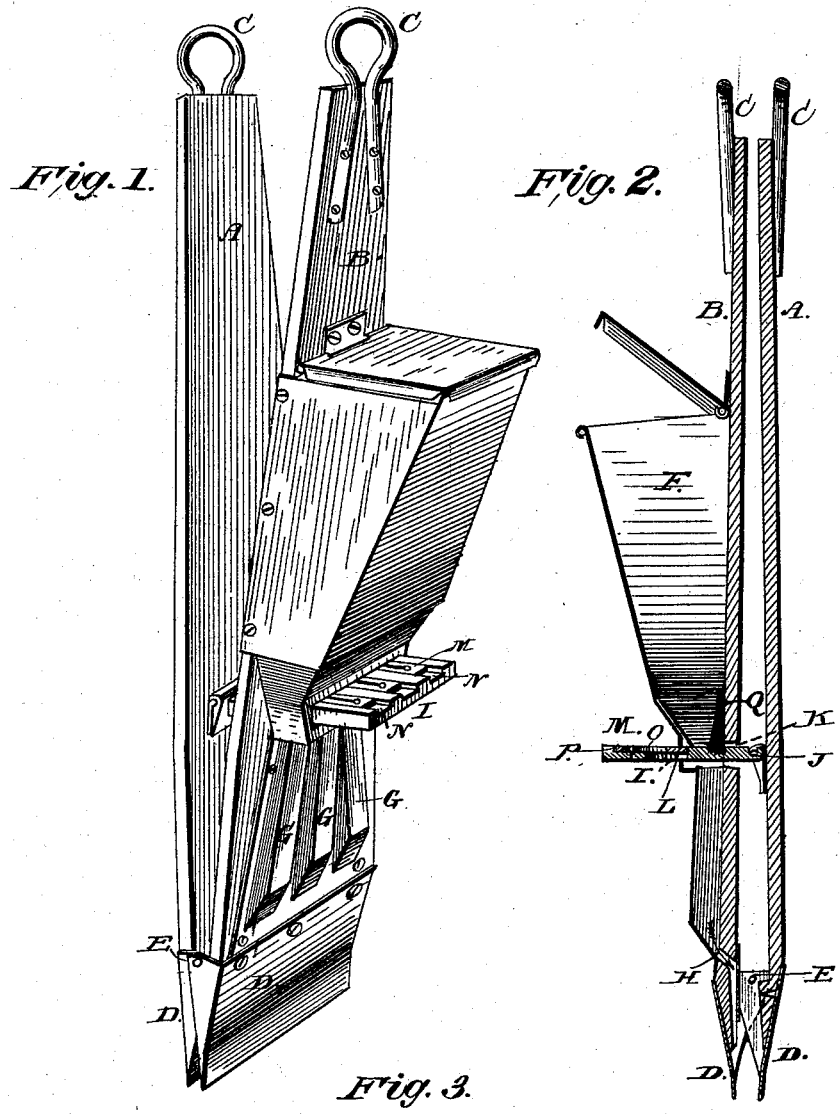
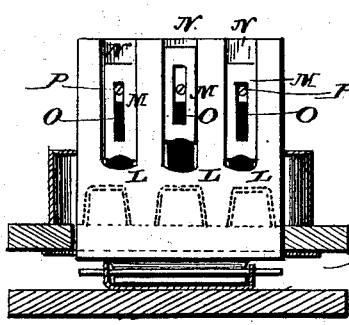
Witnesses:
Fred G. Dietrich,
J. R. Littell,
Inventor:
Charles B. Arnold.
by C. A. Snow & Co.,
Attorneys.

UNITED STATES PATENT OFFICE.

CHARLES B. ARNOLD, OF GLENCOE, KENTUCKY.

HAND CORN-PLANTER.

SPECIFICATION forming part of Letters Patent No. 229,300, dated June 29, 1880.

Application filed December 30, 1879.

*To all whom it may concern:*

Be it known that I, CHARLES B. ARNOLD, of Glencoe, in the county of Gallatin and State of Kentucky, have invented certain new and useful Improvements in Hand Corn-Planters; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a vertical sectional view, and Fig. 3 is a horizontal cross-section.

Corresponding parts in the several figures are denoted by like letters of reference.

This invention relates to hand corn-planters; and it consists in certain improvements in the construction of the same by which the grains are dropped separately some distance apart, instead of being piled together in the hill, as is the case with planters of the usual construction.

The construction and operation of my improved corn-planter will be hereinafter fully described with reference to the drawings, in which—

A B represent the legs of the planter, which are provided with handles C C, and at their lower ends with blades D D, which latter have inturned flanges E E, by which they are hinged or pivoted together in such a manner as to be capable of being opened or closed in the usual manner.

F is the box or hopper, which is secured upon the leg B. Said box is contracted at the bottom to a width slightly exceeding that of an ordinary kernel of corn, while the length of the bottom opening may be equal to the entire width of the hopper. Seed-tubes G G are arranged below the hopper, and terminate in openings H, upon the inside of leg B, to which the grain is thus conducted when the device is in operation.

I is the seed-slide, which is hinged upon the inside of leg A by a pin, J, as shown. Said slide passes through a transverse opening, K, in leg B and the bottom of the seed-box above the seed-tubes, and it is provided with openings or seed-cups L, corresponding to the seed-tubes in number and location.

The size of the openings L may be regulated by the adjustable slides M, fitted in grooves N in slide I, and provided with slots O, which accommodate the heads of the set-screws P, by which the said adjusting-slides are secured.

The bottom of the seed box or hopper is provided upon its inner side, adjoining leg B, with a brush, Q, or its equivalent, the function of which is to assist in raking the grains from the seed-cups into the tubes.

In operation my improved corn-planter is manipulated by the handles C C. Bringing the latter apart causes the hopper to pass over the cups L in the seed-slide, in each of which a kernel of corn is thus deposited. By the same motion the blades D D are closed together for insertion into the ground. By closing the handles C C together the blades D D are forced apart, thus opening the ground for the admission of the seed, which latter drops through the seed-tubes, which, by the same motion, are passed under the seed cups L, from which the kernels are raked down into the said seed-tubes by the brush Q.

The construction of my improved corn-planter is simple and inexpensive, and the advantages of having the kernels of seed dropped separately instead of in a heap are too obvious to require comment.

Having thus described my invention, I claim and desire to secure by Letters Patent of the United States—

In a hand corn-planter, the combination of the hopper F, contracted at its lower end, as described, with the seed-slide I, provided with the adjustable slides M, and the metal seed-delivery tubes G, secured to the outside of leg B of the planter, substantially as and for the purposes set forth.

In testimony that I claim the foregoing as my own I have hereto affixed my signature in presence of two witnesses.

CHARLES B. ARNOLD.

Witnesses:
B. W. NORMAN,
J. C. SPENCER.